(12) United States Patent
Breugelmans et al.

(10) Patent No.: US 11,227,449 B2
(45) Date of Patent: Jan. 18, 2022

(54) IMAGE RENDERING METHOD AND APPARATUS EMPLOYING FLEXIBLE SCALE RASTERIZATION

(71) Applicant: Sony Interactive Entertainment Inc., Tokyo (JP)

(72) Inventors: Mark Jacobus Breugelmans, London (GB); Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/952,266

(22) Filed: Nov. 19, 2020

(65) Prior Publication Data

US 2021/0158629 A1 May 27, 2021

(30) Foreign Application Priority Data

Nov. 26, 2019 (GB) ...................................... 1917162

(51) Int. Cl.
*G06T 19/20* (2011.01)
*G06F 3/01* (2006.01)
*G06T 17/20* (2006.01)

(52) U.S. Cl.
CPC .............. *G06T 19/20* (2013.01); *G06F 3/013* (2013.01); *G06T 17/20* (2013.01); *G06T 2219/2012* (2013.01); *G06T 2219/2016* (2013.01)

(58) Field of Classification Search
CPC ...................................................... G06T 19/20
See application file for complete search history.

(56) References Cited

U.S. PATENT DOCUMENTS

2018/0276790 A1* 9/2018 Mantor ................. G06T 3/0093
2018/0308266 A1* 10/2018 Surti ..................... G06T 3/0012
2019/0273910 A1    9/2019 Malaika

OTHER PUBLICATIONS

Search Report for corresponding Application GB1917162.8, 4 pages, dated Aug. 19, 2020.
K. T. Mullen et al., "Colour vision as a post-receptoral specialization of the central visual field," Vision Research, vol. 31, No. 1, pp. 119-130 Feb. 1990.
Extended European Search Report for corresponding Application EP 20208128.7, 8 pages, dated Mar. 29, 2021.

* cited by examiner

*Primary Examiner* — Shivang I Patel
(74) *Attorney, Agent, or Firm* — Matthew B. Dernier, Esq.

(57) ABSTRACT

An image rendering method the steps of, for a view of a virtual model having a locus of interest, performing flexible scale rasterisation with a first bin distribution for a luminance channel, and mapping the results to a first pixel space; performing flexible scale rasterisation with a second bin distribution for chrominance channels, and mapping the results to a second pixel space; and outputting an image based upon the luminance and chrominance results mapped to the first and second pixel spaces; where the second bin distribution includes larger bins than the first bin distribution in a region outside the locus of interest.

14 Claims, 6 Drawing Sheets

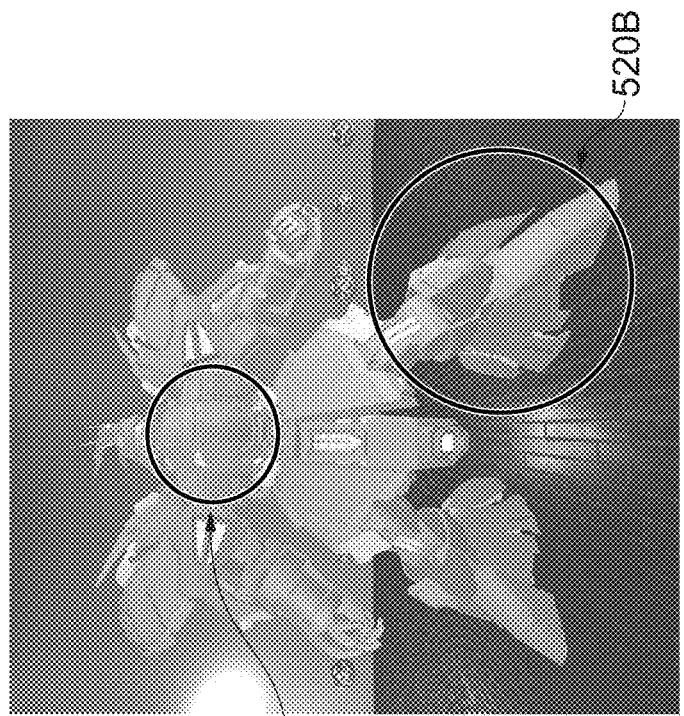
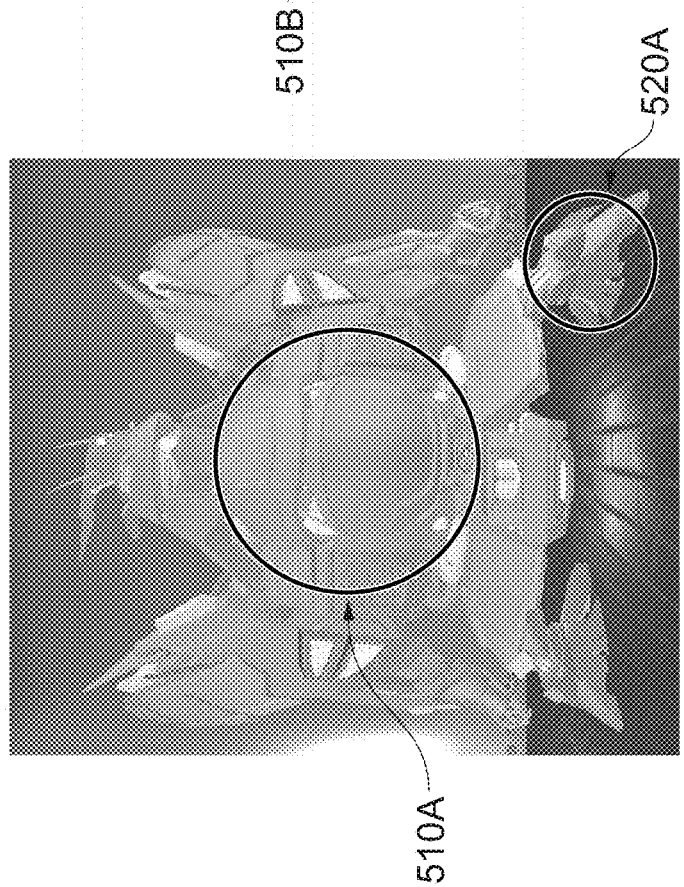
FIG. 5A
FIG. 5B

IMAGE RENDERING METHOD AND APPARATUS EMPLOYING FLEXIBLE SCALE RASTERIZATION

BACKGROUND OF THE INVENTION

Field of the Invention

The present invention relates to an image rendering method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional videogame consoles and other computing devices that display 3D graphics internally represent 3-D objects as a mesh of polygons, and typically triangles.

To render the object on a screen that is comprised of pixels, the mesh representation must be converted into a corresponding set of pixels.

This is typically done by defining a position, orientation, and field-of-view of a virtual camera (i.e. defining what part of the mesh will be visible the image), and then identifying which triangles of the mesh correspond to which pixels in the image, in a process called rasterisation; any texture associated with a respective triangle can then be applied to the identified pixels in the image.

The process of rasterisation assumes that all triangles and all pixels are of equal value within the final image, but typically this is not the case; the user's gaze may not encompass all of the image, their attention may be focused on a particular point of interest within the image, and/or the image may encompass a sufficient field-of-view of the user that parts of the image are projected onto the area of the retina outside the fovea, and so are not perceived with similar clarity to the foveated region.

Recognising this, it is possible to perform rasterization on a per-pixel level for the part of the image expected to be in the fovea region, whilst performing rasterization on only a subset of pixels in the part of the image outside the fovea region, effectively reducing the resolution and associated computational cost for those outer regions. Such an approach is known as foveated rendering.

However, there is still scope to improve such a technique further.

The present invention seeks to address or mitigate this need.

SUMMARY OF THE INVENTION

In a first aspect, an image rendering method is provided.
In another aspect, an entertainment device is provided.
In another aspect, a system is provided.
Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2A-2D are schematic diagrams of flexible scale rasterization and pixel rasterisation spaces in accordance with embodiments of the present description.

FIGS. 5A and 5B are schematic diagrams of an image in a flexible scale rasterisation space and a corresponding mapped image in a pixel rasterisation space in accordance with embodiments of the present description.

DESCRIPTION OF THE EMBODIMENTS

Figure 1:
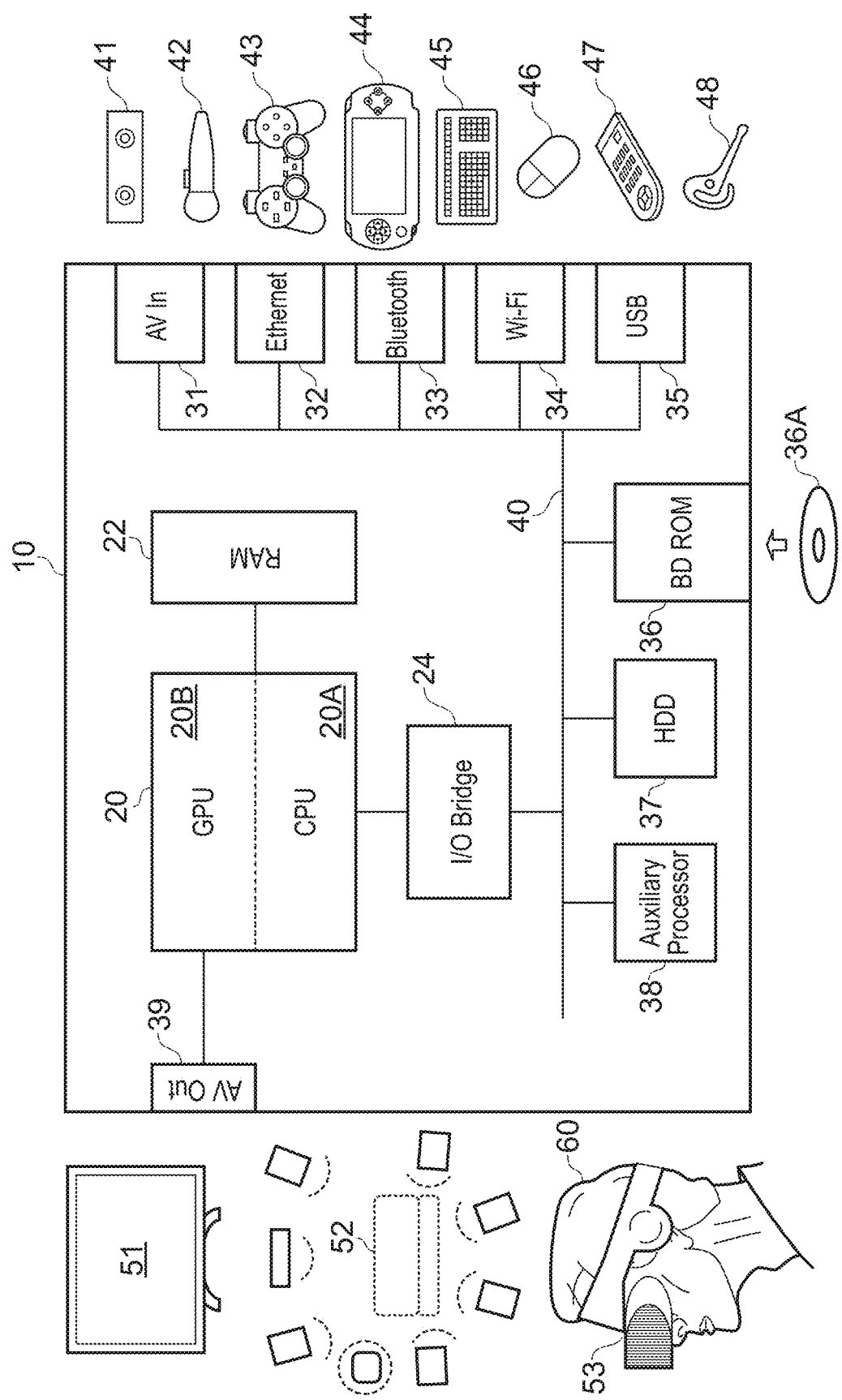
FIG. 1 is a schematic diagram of an entertainment device in accordance with embodiments of the present description.

Referring now to the drawings, wherein like reference numerals designate identical or corresponding parts throughout the several views, an image rendering method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figures 2A, 2B:
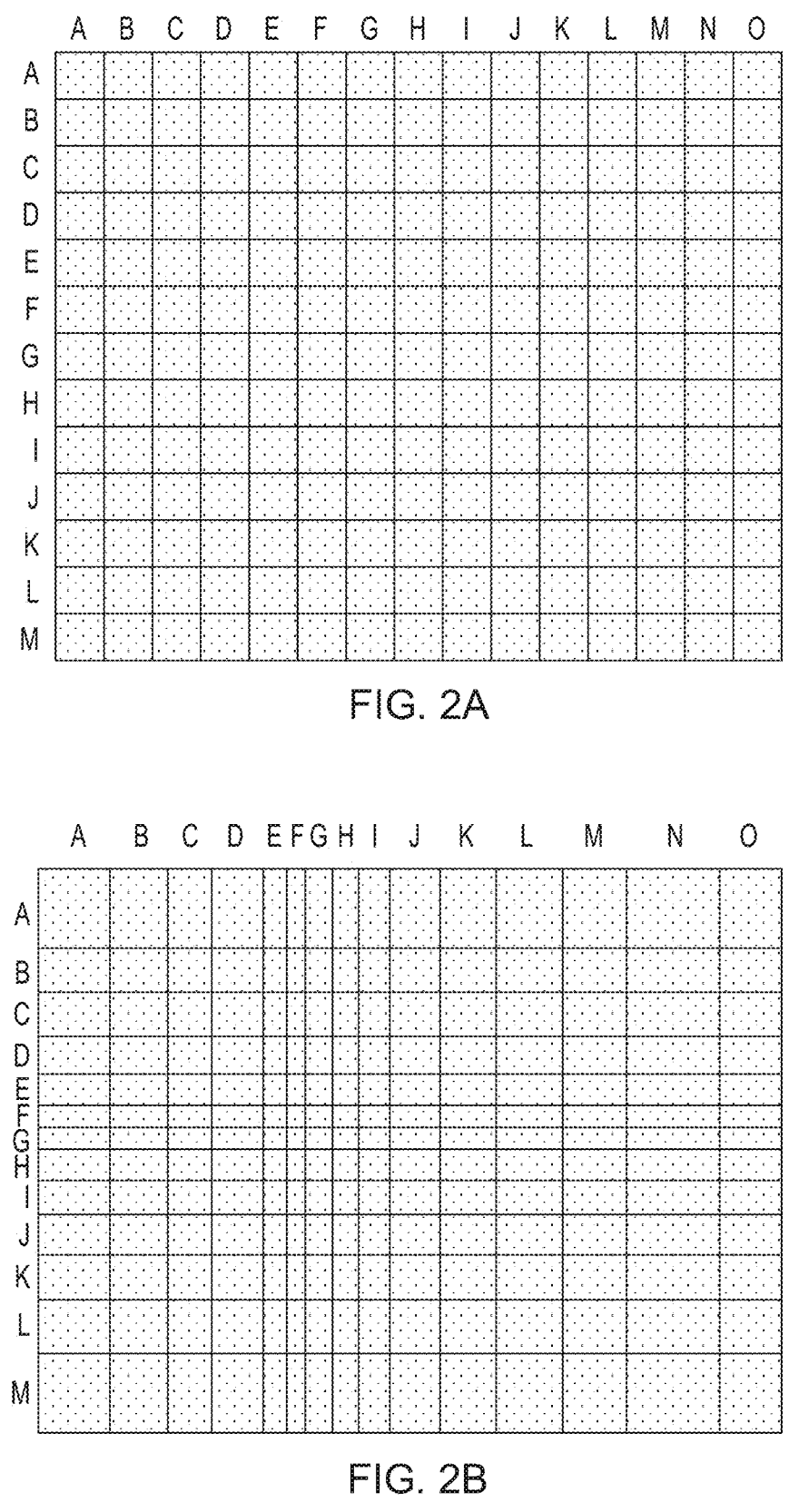

Referring now to FIGS. 2A and 2B, in an example embodiment of the present invention, images are rendered using so-called flexible scale rasterization (FSR).

In this approach, instead of identifying which triangles of a mesh correspond to which pixels in an image, FSR identifies which triangles of a mesh correspond to an array of 'bins', which have a non-uniform spatial distribution. The distribution is typically defined by two curves respectively specifying horizontal and vertical mappings between a uniform distribution and the FSR distribution.

FIG. 2A shows a uniform distribution of pixels in a so-called raster space. In conventional rasterisation, each pixel can be thought of as an equal-sized bin that part of a given triangle either does or does not occupy.

By contrast, FIG. 2B shows a non-uniform distribution of bins in a so-called 'window space' used during FSR. In this case, for ease of understanding there are the same number of bins in FIG. 2B as there are in 2A, although it is not necessary for the number of bins in window space to equal the number of pixels in raster space, as will be explained later herein.

Figure 3:
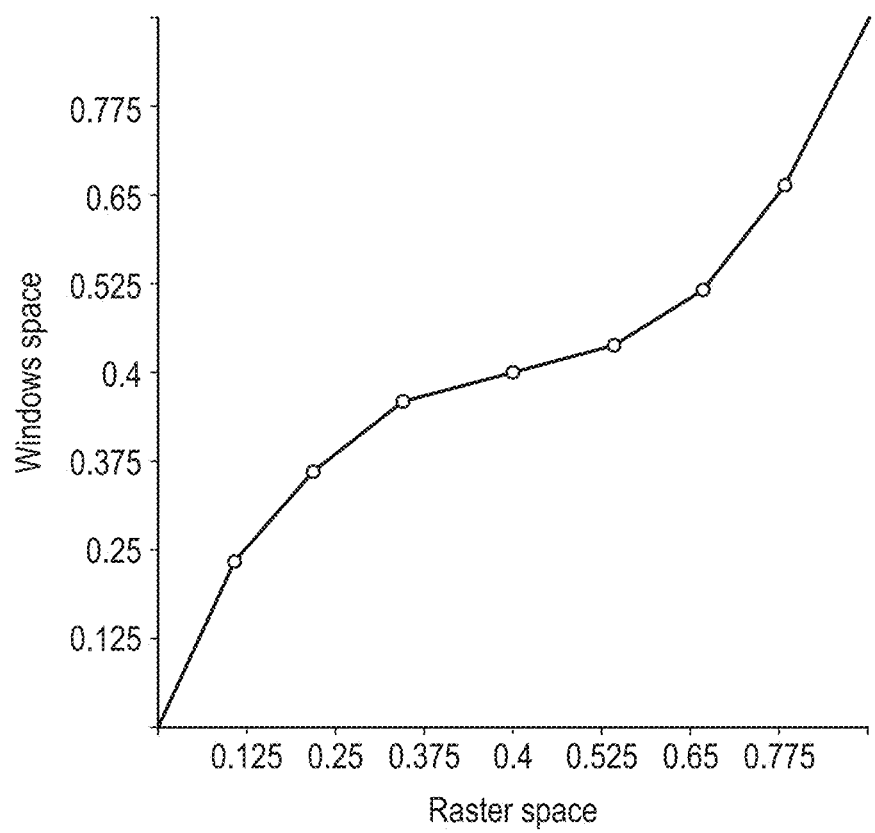
FIG. 3 is a schematic diagram of a curve defining a bin distribution in one direction for flexible scale rasterisation in accordance with embodiments of the present description.

As noted above, the mapping between raster space and window space is typically specified by a respective curve for each of the horizontal and vertical directions, with an example curve shown in FIG. 3 (the increments on each axis are 0.125 in the range 0 to 1). It will be appreciated that a diagonal line would be a 1:1 mapping (i.e. no change).

Figure 2C:
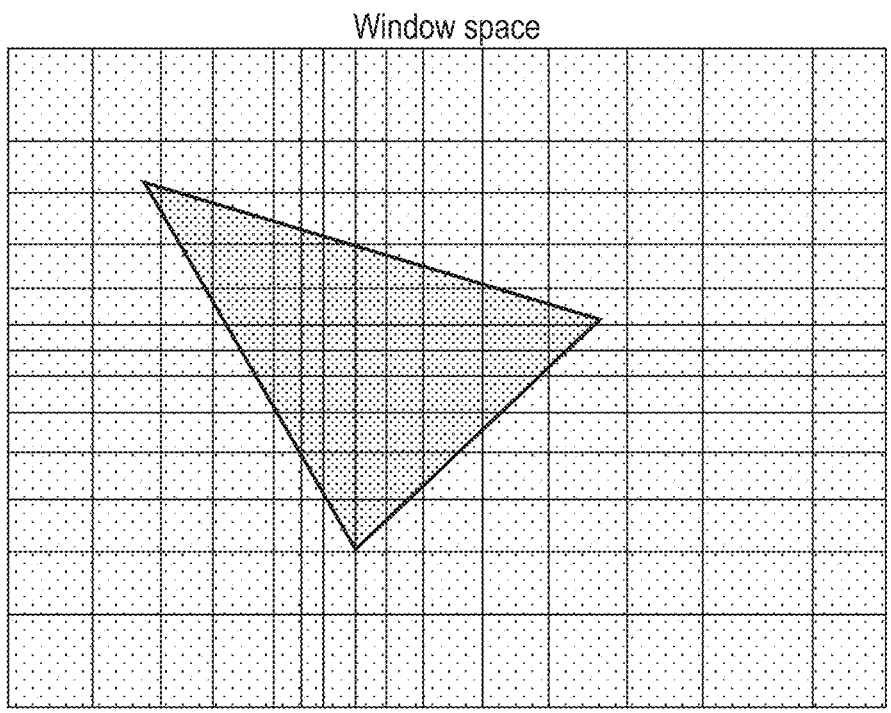

FIG. 2C shows a triangle (e.g. from the mesh of an object to be rendered) projected on to the non-uniform distribution of bins in the window space.

Figure 2D:
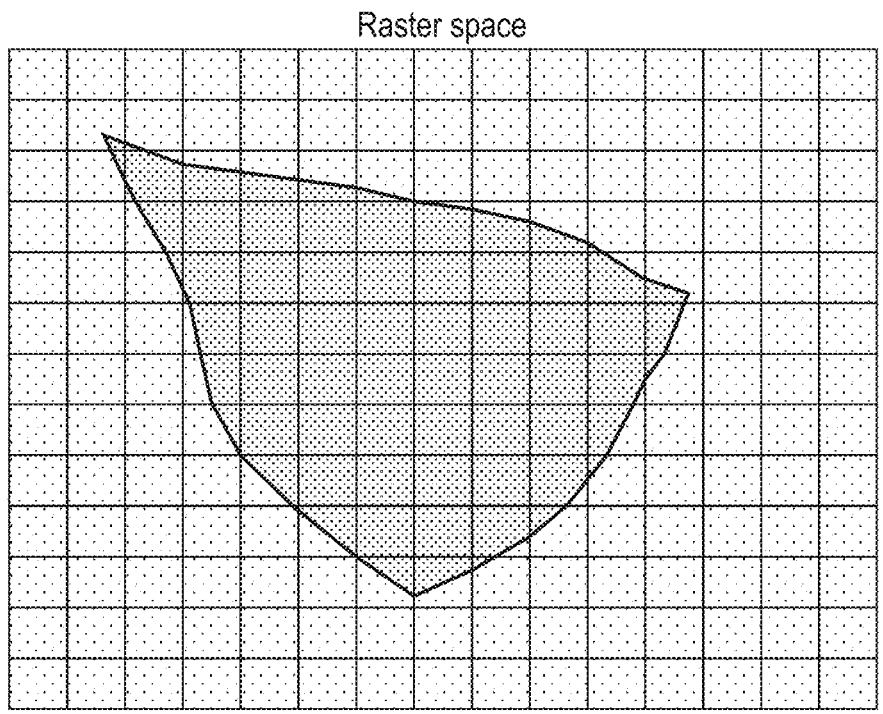

Finally, FIG. 2D illustrates how the triangle would appear in raster space (pixels of an image) if a 1:1 mapping of the FSR bins in FIG. 2C to pixels in FIG. 2D is performed. It can be seen that the higher density of bins within the centre of the triangle in the example window space results in a distortion of the triangle in raster space, expanding its central area.

One potential advantage of FSR over standard pixel-based rasterization is that the nonlinear distribution of bins in the window space can be made to approximate the nonlinear distribution of visual acuity in a user's eye, so that a region of the image corresponding to the user's fovea (high resolution portion of the retina) has a high density of small bins, whilst a region of the image corresponding to the user's peripheral vision has a low-density of a large bins.

Accordingly, if the small bins in the window space are chosen to roughly correspond with individual pixels in the raster space, then an alternative mapping from window space to raster space that generates a 1:1 mapping between bins and pixels for the smallest bins, and a 1:many mapping between bins and pixels for larger bins, will generate an image with an effective variable resolution having a highest, typically maximum, resolution where the bins were smallest (typically corresponding to a presumed or tracked fovea position), and a lowest resolution where the bins were largest (typically corresponding to a presumed or tracked peripheral vision area).

Figure 4:
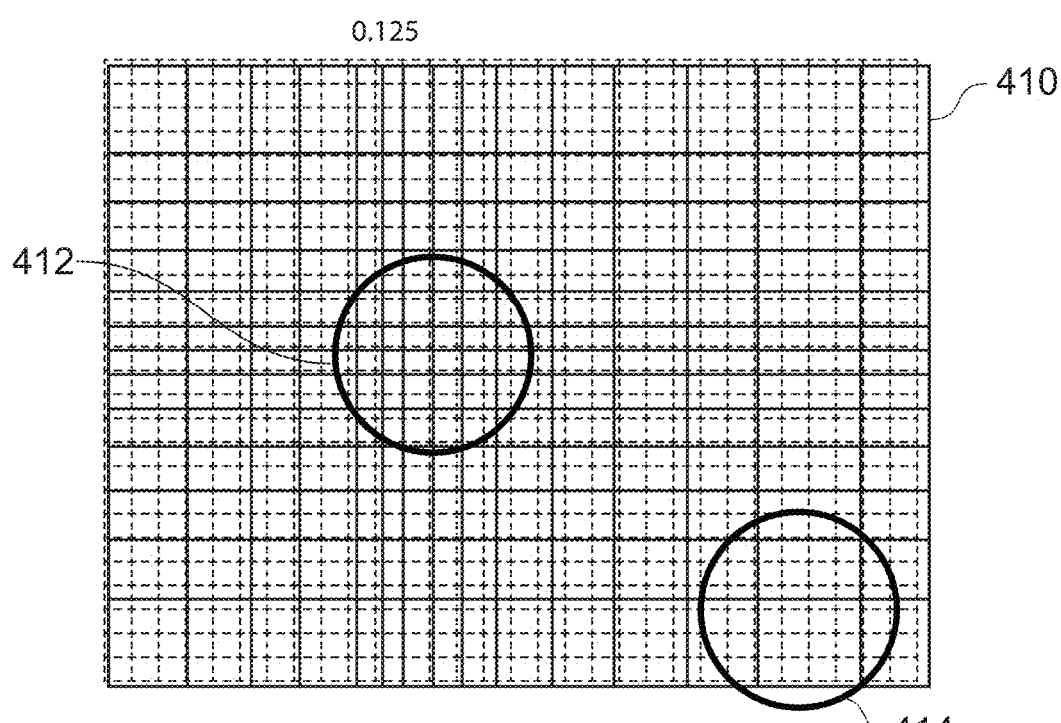
FIG. 4 is a schematic diagram of a mapping from a flexible scale rasterisation space to a pixel rasterisation space in accordance with embodiments of the present description.

This is illustrated schematically in FIG. 4, in which a pixel array 410 (represented by dashed lines) is overlaid on a window space (e.g. like that of FIG. 2B) such that there is a 1:1 mapping between bins and pixels in a fovea region 412 (or equivalent region at which a high resolution is desired) and a 1:many mapping between bins and pixels in a peripheral region 414 (or equivalent region at which a high resolution is not desired).

It will be appreciated that an appropriate mapping between bins and pixels can be based upon the curves used to define the distribution of bins in window space.

In this way, foveated rendering (or more generally variable effective resolution rendering to uniform resolution pixels) can be efficiently achieved by rendering mesh components to bins whose distribution is defined by horizontal and vertical curves (or any suitable means of defining a 2D distribution), and then mapping the bins to pixels in the raster image based on an inverse of the bin distribution, typically but not necessarily set to provide a 1:1 size mapping between the smallest bins and pixels, or optionally where the number of the smallest bins is below a threshold, between bins and pixels for the smallest bins having a population in window space above a threshold number. The mapping process can use any suitable sampling technique, for example based on bin size, to derive a given pixel value from the corresponding bin (or bins, in the case of spanning a bin boundary, or the use of smoothing).

Hence in summary FSR is a feature (software or preferably hardware) which allows the resolution of the rendering to be adjusted across render buffers dynamically so that areas requiring more resolution can be rendered in more detail. As noted above, an example application of this is foveated rendering, which concentrates high resolution rendering to the area of the image corresponding to the fovea (e.g. the centre) of the viewer, matching the human optical system which has a higher density of photoreceptors in the foveal region. Gaze tracked foveated rendering systems utilise this further by moving the high resolution area to track the part of the image that the eye is looking at. In the above scheme, the fovea position from the gaze tracker could then be used to adjust the x and y mapping curves and hence move the distribution of higher resolution bins to follow the fovea position on the image.

An example is illustrated in FIGS. 5A and 5B. Like FIG. 2D, FIG. 5A shows the effective distortion in the image of the character caused by the increased density of bins coincident with the character's upper torso, and the relative paucity of bins in the corners and more generally the peripheral of the image.

FIG. 5B then shows the mapping from the window space to the raster space based on the inverse of the curves (or whatever suitable scheme was used to define the bin distribution).

Now, the region of the image showing the character's upper torso has a large degree of detail (i.e. a high effective resolution), as the large region 510A generated in window space now occupies a small region 510B of raster space (for example due to a 1:1 mapping between bins and pixels), whilst a peripheral region showing the character's foot as a low degree of detail (i.e. a low effective resolution), as the small region 520A generated in window space now occupies a large region 520B of raster space (for example due to a 1:many mapping between bins and pixels).

As noted previously herein, the above technique can provide an efficient means by which to generate a foveated render of an image. However, there is scope for improvement.

In particular, in embodiments of the present description it has been recognised that, in general, the human eye's peripheral colour sensitivity is comparatively worse than its peripheral contrast sensitivity. In other words, users are more aware of a reduction in quality of a representation of luminance in an image than they are of a reduction in quality of a representation of chrominance.

However the above variable scale rasterisation technique simply maps the rendered bins to rendered pixels, and so the RGB colour information in the resulting pixels combines both luminance and chrominance data at the same effective resolution.

This is undesirable, as it either means that to achieve an appropriate luminance quality there is an unnecessary degree of chrominance quality (i.e. colour detail that the user will not perceive) and hence a correspondingly unnecessary processing overhead that will impact on frame rates and the like, or conversely that at a suitable level of chrominance quality there is an unsuitably low luminance quality (i.e. a perceived lack of clarity) that it would be desirable to improve without a cost incurred by a corresponding improvement of chrominance quality.

Accordingly, in embodiments of the present description, separate window spaces are provided for the rendering of luminance (Y') and chrominance (UV) channels, with different respective bin mappings. In particular, whilst optionally the bin sizes in the fovea/high resolution parts of the respective luminance and chrominance window spaces may be identically or similarly small, the bin sizes in the peripheral or more generally non-fovea/lower resolution parts of the respective luminance and chrominance window spaces are different, with the bin sizes of the chrominance window space being relatively larger than the bin sizes of the luminance window space. This may be achieved for example with different respective horizontal and vertical curves for the Y' and UV window spaces.

Hence, the effective resolution of the chrominance values in the peripheral, or more generally non-fovea/lower resolution portions of the raster space image, can be lower than the effective resolution of the luminance values in these portions whilst the effective resolution in the fovea/high resolution portions may be the same.

In this way, different effective resolutions for luminance and chrominance can be achieved independently of each other so that both an appropriate luminance quality and appropriate chrominance quality can be achieved without unnecessary computational overhead.

The separately generated per-pixel Y' and UV values can be combined and typically converted to an RGB space to generate a final image.

In a case where flexible scale rasterisation is performed in hardware, and hence may only have a single window space buffer and raster space buffer, the rendering of luminance (Y') and chrominance (UV) channels may be performed sequentially, with the results then combined and for example converted to RGB in an image buffer.

However, the processor performing two FSR processes in sequence still produces a net reduction in computational overhead for a given effective luminance resolution on a single Y' channel, due to the significant reduction in chrominance resolution on the UV channels compared to the resolution needed on each of three RGB channels to achieve the same effective luminance resolution.

Figure 6:
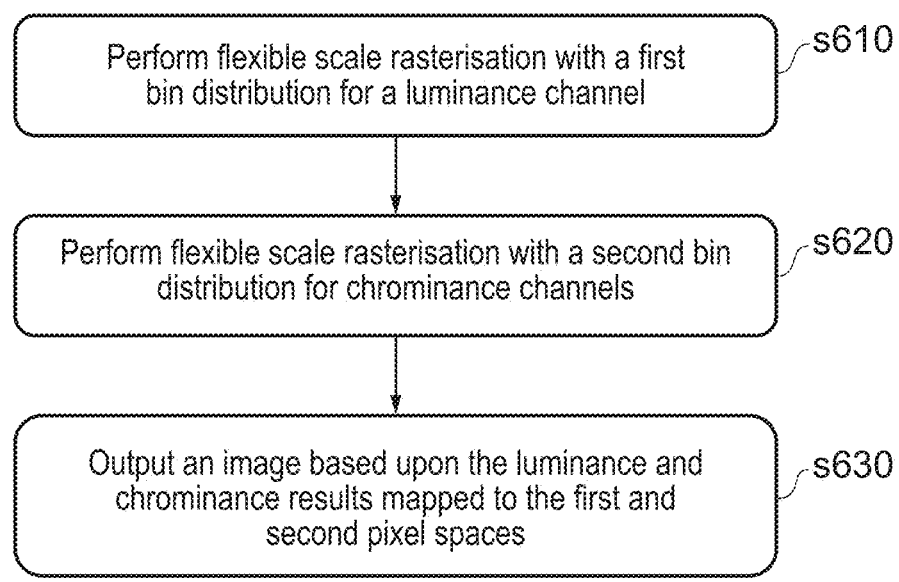
FIG. 6 is a flow diagram of an image rendering method in accordance with embodiments of the present description.

Turning now to FIG. 6, in a summary embodiment of the & description, an image rendering method comprises, for a view of a virtual model having a locus of interest,
- a first step s610 of performing flexible scale rasterisation with a first bin distribution for a luminance channel, and mapping the results to a first pixel space, as described previously herein;
- a second step s620 of performing flexible scale rasterisation with a second bin distribution for chrominance channels, and mapping the results to a second pixel space, as described previously herein; and
- a third step s630 of outputting an image based upon the luminance and chrominance results mapped to the first and second pixel spaces, as described previously herein;
- wherein the second bin distribution includes larger bins than the first bin distribution in a region outside the locus of interest, as described previously herein.
  - Equivalently, this final integer means that the pixel to bin ratio for the second bin distribution increases (i.e. more pixels per bin) more rapidly than the ratio for the first bin distribution in at least one region outside the locus of interest, such that the effective resolution of the final image for the chrominance results in that region is lower than the effective resolution of the final image for the luminance results.

It will be apparent to a person skilled in the art that variations in the above method corresponding to operation of the various embodiments of the method and/or apparatus as described and claimed herein are considered within the scope of the present disclosure, including but not limited to where:
- the step of outputting an image based upon the luminance and chrominance results comprises converting the luminance channel results and chrominance channel results in pixel space into RGB pixel values; and outputting the pixels as an image;
- the first bin distribution and the second bin distribution are defined by separate respective pairs of curves, the pairs of curves in turn respectively specifying horizontal and vertical mappings between a uniform distribution and the respective flexible scale rasterisation distribution;
  - in this case, mappings of the results to a respective pixel space being based upon a respective inverse of the respective curves specifying horizontal and vertical mappings between a uniform distribution and the respective flexible scale rasterisation distribution;
- the locus of interest corresponds to one selected from the list consisting of the centre of the image, the location of a reticule or pointer in the image, the location of a user avatar in the image, and the location of a predetermined object or non-player character in the image;
- the locus of interest corresponds to the portion of the image projected onto a fovea of a user's eye;
  - In this case, the portion of the image projected onto a fovea of a user's eye being estimated by tracking the gaze of at least one of the user's eyes;
- the region outside the locus of interest is one selected from the list consisting of a region adjacent to the locus of interest, and a region a predetermined distance from the locus of interest (in other words, the divergence in effective resolution between chrominance and luminance channels can either start immediately outside the locus of interest, such as a foveated region, or a predetermined distance from that locus, or in one or more regions of the screen, such as a predetermined peripheral area of the screen, or a combination of these, such as a peripheral area unless within a predetermined distance of the current locus of interest); and
- the steps of performing flexible scale rasterisation for a luminance channel, and performing flexible scale rasterisation for chrominance channels, are performed sequentially;
  - in this case, these steps being performed using the same memory space prior to mapping results to respective pixel spaces.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

An example of such conventional hardware is an entertainment device such as the Sony PlayStation 4 ®. Referring to FIG. 1, this schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Accordingly, in a summary embodiment of the present description, an entertainment device (10), such as a Sony PlayStation 4 ® or 5 ®, may comprise virtual model generation circuitry (such as for example CPU 20A and/or GPU 20B) adapted (for example by suitable software instruction) to generate a view of a virtual model having a locus of interest; flexible scale rasterization circuitry circuitry (such as for example CPU 20A and/or GPU 20B) adapted (for example by suitable software instruction) to perform flexible scale rasterisation with a first bin distribution for a luminance channel, and to map the results to a first pixel space; flexible scale rasterization circuitry (such as for example CPU 20A and/or GPU 20B) adapted (for example by suitable software instruction) to perform flexible scale rasterization with a second bin distribution for chrominance channels, and to map the results to a second pixel space; and image processing circuitry (such as for example CPU 20A and/or GPU 20B) adapted (for example by suitable software instruction) to output an image based upon the luminance and chrominance results mapped to the first and second pixel spaces, wherein the second bin distribution includes larger bins than the first bin distribution in a region outside the locus of interest.

It will be appreciated that the above entertainment device may be further suitably adapted to implement the methods and techniques described herein.

Furthermore, instrument device may form part of a wider system comprising additional hardware to implement methods and techniques described herein.

Accordingly, in a summary embodiment of the present description, a system comprises the above entertainment device, and also a camera operable to capture an image of at least one of the user's eyes (for example a monoscopic or stereoscopic video camera 41 such as the PlayStation Eye®), wherein the system comprises an eye tracking processor operable to estimate what portion of a displayed image the user's gaze is directed towards (such as for example CPU 20A and/or GPU 20B, operating for example under suitable software instruction).

Optionally, this system may also comprise a head-mounted display operable to display the image output by the image processing circuitry.

Further optionally, the head mounted display comprises the camera.

Yet further optionally, the head mounted display comprises the eye tracking processor, or comprises a processor that shares part of the eye tracking task with a processor of the entertainment device.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An image rendering method, comprising the steps of:
for a view of a virtual model having a locus of interest,
performing flexible scale rasterisation with a first bin distribution for a luminance channel, and mapping the results to a first pixel space;
performing flexible scale rasterisation with a second bin distribution for chrominance channels, and mapping the results to a second pixel space; and
outputting an image based upon the luminance and chrominance results mapped to the first and second pixel spaces;
wherein the second bin distribution includes larger bins than the first bin distribution in a region outside the locus of interest, and
wherein the steps of performing flexible scale rasterisation for a luminance channel, and performing flexible scale rasterisation for chrominance channels, are performed sequentially.

2. The image rendering method of claim 1, wherein the step of outputting an image based upon the luminance and chrominance results comprises: converting the luminance channel results and chrominance channel results in pixel space into RGB pixel values; and
outputting the pixels as an image.

3. The image rendering method of claim 1, in which the first bin distribution and the second bin distribution are defined by separate respective pairs of curves, the pairs of curves in turn respectively specifying horizontal and vertical mappings between a uniform distribution and the respective flexible scale rasterisation distribution.

4. The image rendering method of claim 3, in which mappings of the results to a respective pixel space are based upon a respective inverse of the respective curves specifying horizontal and vertical mappings between a uniform distribution and the respective flexible scale rasterisation distribution.

5. The method of claim 1, in which the locus of interest corresponds to at least one of:
   i. the centre of the image;
   ii. the location of a reticule or pointer in the image;
   iii. the location of a user avatar in the image; and
   iv. the location of a predetermined object or non-player character in the image.

6. The method of claim 1, in which the locus of interest corresponds to the portion of the image projected onto a fovea of a user's eye.

7. The method of claim 6, in which the portion of the image projected onto a fovea of a user's eye is estimated by tracking the gaze of at least one of the user's eyes.

8. The method of claim 1, in which the region outside the locus of interest includes at least one of:
   i. a region adjacent to the locus of interest; and
   ii. a region a predetermined distance from the locus of interest.

9. The method of claim 1, in which these steps are performed using the same memory space prior to mapping results to respective pixel spaces.

10. A non-transitory, computer readable medium having a computer program comprising computer executable instructions stored thereon, which when executed by a computer system cause the computer system to perform an image rendering method, comprising the steps of:
   for a view of a virtual model having a locus of interest,
   performing flexible scale rasterisation with a first bin distribution for a luminance channel, and mapping the results to a first pixel space;
   performing flexible scale rasterisation with a second bin distribution for chrominance channels, and mapping the results to a second pixel space; and
   outputting an image based upon the luminance and chrominance results mapped to the first and second pixel spaces;
   wherein the second bin distribution includes larger bins than the first bin distribution in a region outside the locus of interest, and
   wherein the steps of performing flexible scale rasterisation for a luminance channel, and performing flexible scale rasterisation for chrominance channels, are performed sequentially.

11. An entertainment device, comprising:
   virtual model generation circuitry adapted to generate a view of a virtual model having a locus of interest;
   flexible scale rasterization circuitry adapted to perform flexible scale rasterisation with a first bin distribution for a luminance channel, and to map the results to a first pixel space;
   flexible scale rasterization circuitry adapted to perform flexible scale rasterization with a second bin distribution for chrominance channels, and to map the results to a second pixel space; and
   image processing circuitry adapted to output an image based upon the luminance and chrominance results mapped to the first and second pixel spaces;
   wherein the second bin distribution includes larger bins than the first bin distribution in a region outside the locus of interest, and
   wherein the performing flexible scale rasterisation for a luminance channel, and the performing flexible scale rasterisation for chrominance channels, are performed sequentially.

12. A system, comprising:
   an entertainment device, comprising:
   virtual model generation circuitry adapted to generate a view of a virtual model having a locus of interest;
   flexible scale rasterization circuitry adapted to perform flexible scale rasterisation with a first bin distribution for a luminance channel, and to map the results to a first pixel space;
   flexible scale rasterization circuitry adapted to perform flexible scale rasterization with a second bin distribution for chrominance channels, and to map the results to a second pixel space; and
   image processing circuitry adapted to output an image based upon the luminance and chrominance results mapped to the first and second pixel spaces;
   wherein the second bin distribution includes larger bins than the first bin distribution in a region outside the locus of interest; and
   wherein the performing flexible scale rasterisation for a luminance channel, and the performing flexible scale rasterisation for chrominance channels, are performed sequentially,
   a camera operable to capture an image of at least one of the user's eyes; and
   an eye tracking processor operable to estimate what portion of a displayed image the user's gaze is directed towards.

13. The system of claim 12, comprising: a head-mounted display operable to display the image output by the image processing circuitry.

14. The system of claim 13, in which the head mounted display comprises the camera.

* * * * *